United States Patent
Park et al.

(10) Patent No.: US 7,703,656 B2
(45) Date of Patent: Apr. 27, 2010

(54) FRICTION STIR WELDING TOOL AND FRICTION STIR WELDING APPARATUS

(75) Inventors: Seung Hwan Park, Hitachi (JP); Satoshi Hirano, Hitachi (JP); Yutaka Sato, Sendai (JP); Kyosuke Yoshimi, Sendai (JP); Hiroyuki Kokawa, Sendai (JP)

(73) Assignees: Hitachi, Ltd., Tokyo (JP); Tohoku University, Sendai-shi ( * ) Notice: Subject to any disclaimer, the term of this patent is extended or adjusted under 35 U.S.C. 154(b) by 0 days.

(21) Appl. No.: 11/935,488

(22) Filed: Nov. 6, 2007

(65) Prior Publication Data

US 2008/0128472 A1 Jun. 5, 2008

(30) Foreign Application Priority Data

Nov. 6, 2006 (JP) ............................. 2006-299958

(51) Int. Cl.
*B23K 37/00* (2006.01)
*B23K 20/12* (2006.01)

(52) U.S. Cl. ..................................... 228/2.1; 228/112.1

(58) Field of Classification Search ........................ None
See application file for complete search history.

(56) References Cited

U.S. PATENT DOCUMENTS

| 6,237,835 | B1 * | 5/2001 | Litwinski et al. | 228/112.1 |
| 6,648,206 | B2 * | 11/2003 | Nelson et al. | 228/112.1 |
| 6,776,328 | B2 * | 8/2004 | Rice et al. | 228/112.1 |
| 6,908,690 | B2 * | 6/2005 | Waldron et al. | 428/615 |
| 6,913,186 | B2 * | 7/2005 | Vyas | 228/112.1 |
| 6,994,242 | B2 * | 2/2006 | Fuller et al. | 228/112.1 |
| 7,121,448 | B2 * | 10/2006 | Subramanian et al. | 228/2.1 |
| 7,163,136 | B2 * | 1/2007 | Hempstead et al. | 228/2.1 |
| 7,357,292 | B2 * | 4/2008 | Tolle et al. | 228/112.1 |
| 7,455,211 | B2 * | 11/2008 | Kay | 228/112.1 |

(Continued)

FOREIGN PATENT DOCUMENTS

JP 10-512329 11/1998

(Continued)

OTHER PUBLICATIONS

Japanese Official Action issued on Jul. 1, 2008, in JP Application No. 2006-299958.

(Continued)

*Primary Examiner*—Kiley Stoner
(74) *Attorney, Agent, or Firm*—Antonelli, Terry, Stout & Kraus, LLP.

(57) ABSTRACT

An object of the present invention is to provide a friction stir welding tool which enables friction stir welding of a wide range of materials, from low-melting temperature metallic materials including aluminum to high-melting temperature metallic materials including steel.

An entire friction stir welding tool or a tool tip including a pin is made of Mo alloy having a dual phase microstructure of Mo and intermetallic compound $Mo_5SiB_2$. It is desirable that the Mo alloy be composed of 6.0 to 10.0 mol% of Si, 10.0 to 20.0 mol% of B, and 20 to 60% of Mo-phase volume content. This Mo alloy tool has excellent high-temperature strength and wear-resistance properties and hardly deform and wear when used for the welding of steel.

8 Claims, 5 Drawing Sheets

U.S. PATENT DOCUMENTS

| | | | |
|---|---|---|---|
| 2002/0046864 A1* | 4/2002 | Bellino et al. | 174/70 B |
| 2002/0185524 A1 | 12/2002 | Zhao et al. | |
| 2004/0126613 A1 | 7/2004 | Bewlay et al. | |
| 2004/0238599 A1 | 12/2004 | Subramanian et al. | |
| 2006/0157531 A1* | 7/2006 | Packer et al. | 228/2.1 |
| 2006/0169747 A1* | 8/2006 | Tolle et al. | 228/112.1 |
| 2007/0040006 A1* | 2/2007 | Charles et al. | 228/112.1 |
| 2007/0102492 A1* | 5/2007 | Nelson et al. | 228/112.1 |

FOREIGN PATENT DOCUMENTS

| | | |
|---|---|---|
| JP | 2002-301580 | 10/2002 |
| JP | 2003-532543 | 11/2003 |
| JP | 2004-358556 | 12/2004 |
| JP | 2005-199281 | 7/2005 |
| JP | 2006-136945 | 6/2006 |
| WO | WO 96/22402 | 7/1996 |
| WO | WO 2008/102209 A2 * | 8/2008 |

OTHER PUBLICATIONS

Extended European Search Report dated Apr. 4, 2008, for Application No. 07021592.6-1262.

* cited by examiner

FRICTION STIR WELDING TOOL AND FRICTION STIR WELDING APPARATUS

CLAIM OF PRIORITY

The present application claims priority from Japanese application serial No. 2006-299958, filed on Nov. 6, 2006, the content of which is hereby incorporated by reference into this application.

BACKGROUND OF THE INVENTION

1. Field of the Invention

The present invention relates to a friction stir welding tool and a friction stir welding apparatus.

2. Prior Art

As one of welding methods for welding a material to be welded without melting, there is a friction stir welding method. The friction stir welding method is a method wherein a welding tool, made of cylindrical member substantially harder than the material to be welded, is forcibly inserted into the welding portion of the material to be welded while the tool rotates, thereby welding the material by means of frictional heat generated between the welding tool and the material to be welded while the tool rotates and moves. The friction stir welding method softens the material to be welded due to frictional heat generated between the welding tool and the material to be welded and uses the plastic flow phenomenon associated with the rotation of the welding tool; and the method is based on the principle different from the principle on which an arc welding method for melting a material to be welded is based.

With regard to tool material used for the friction stir welding method, well-known materials are those made of PCBN which is a ceramic (for example, see the patent document 1), those made of W-based material including solid solution reinforcing material such as Re (for example, see the patent document 2), and those made of WC-type ultrahard alloy containing Co (see patent document 3).

[Patent document 1] National publication No. of International Patent Application 2003-532543

[Patent document 2] Japanese Patent Application Laid-open No. 2004-358556

[Patent document 3] Japanese Patent Application Laid-open No. 2005-199281

SUMMARY OF THE INVENTION

Friction stir welding of relatively low-melting temperature metallic material, such as aluminum alloy, has been put into practice, and a relatively large number of reports about the friction stir welding of high-melting temperature metallic material, such as steel. However, there are considerably a small number of reports about the friction stir welding of steel in comparison with the study reports about the friction stir welding of aluminum alloy. One of main reasons is that there are no appropriate welding tools.

Material of the welding tool for friction stir welding of high-melting temperature metallic material is required to be strong at high temperatures, wear-resistant, and non-responsive. However, when conventional material of the welding tool is used for welding high-melting temperature metallic material, wear and deformation tend to occur, inhibiting good welding.

An object of the present invention is to provide a friction stir welding tool and a friction stir welding apparatus equipped with the tool which enables friction stir welding of a wide range of materials, from low-melting temperature metallic materials including aluminum to high-melting temperature metallic materials including steel.

The present invention is a friction stir welding tool having a pin that protrudes from the end face of the cylindrical member, wherein at least the pin is made of Mo alloy which has a dual phase microstructure of Mo and intermetallic compound $Mo_5SiB_2$.

Furthermore, the present invention is a friction stir welding apparatus wherein there are provided a tool having a pin that protrudes from an end face of a cylindrical member and a tool rotating mechanism, and the pin of the tool is inserted into the welding portion of a material to be welded while the pin rotates thereby executing welding; and at least the pin of the tool is made of Mo alloy which has a dual phase microstructure of Mo and intermetallic compound $Mo_5SiB_2$.

It is desirable that the Mo alloy be composed of 6.0 to 10.0 mol % of Si, 10.0 to 20.0 mol % of B, and 20 to 60% of Mo-phase volume content.

The friction stir welding tool according to the present invention has excellent high-temperature strength and wear-resistance properties and can be applied to wide range of materials from low-melting temperature metallic materials including aluminum to high-melting temperature metallic materials including steel.

DETAILED DESCRIPTION OF THE PREFERRED EMBODIMENTS

By making a friction stir welding tool of Mo alloy having a dual phase microstructure of Mo and $Mo_5SiB_2$, the 0.2% proof stress and fracture stress increase, and high-temperature strength and wear-resistance properties become excellent even when friction stir welding of steel is executed at a welding temperature of approximately 1200° C. As a result, it is possible to reduce wear of a welding tool when the friction stir welding of material with a high melting point, including steel, is executed.

It is desirable that the Mo alloy which has a dual phase microstructure of Mo and $Mo_5SiB_2$ be composed of 6.0 to 10.0 mol % of Si, 10.0 to 20.0 mol % of B, and 20 to 60% of Mo-phase volume content. Using such Mo alloy will significantly increase 0.2% proof stress and fracture stress, thereby increasing the high-temperature strength and wear-resistance properties.

A friction stir welding tool according to the present invention is suitable for welding a material made of aluminum alloy, magnesium alloy, copper alloy, steel, titanium alloy, Ni alloy, or Ni-based super alloy.

Hereafter, embodiments of the present invention will be explained with reference to the drawings.

Embodiment 1

Figure 1:
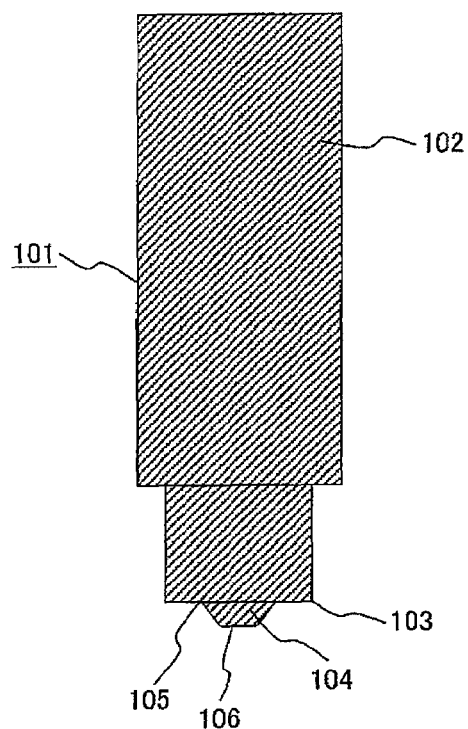
FIG. 1 is a schematic diagram to show a friction stir welding tool of an embodiment of the present invention.
Figure 6:
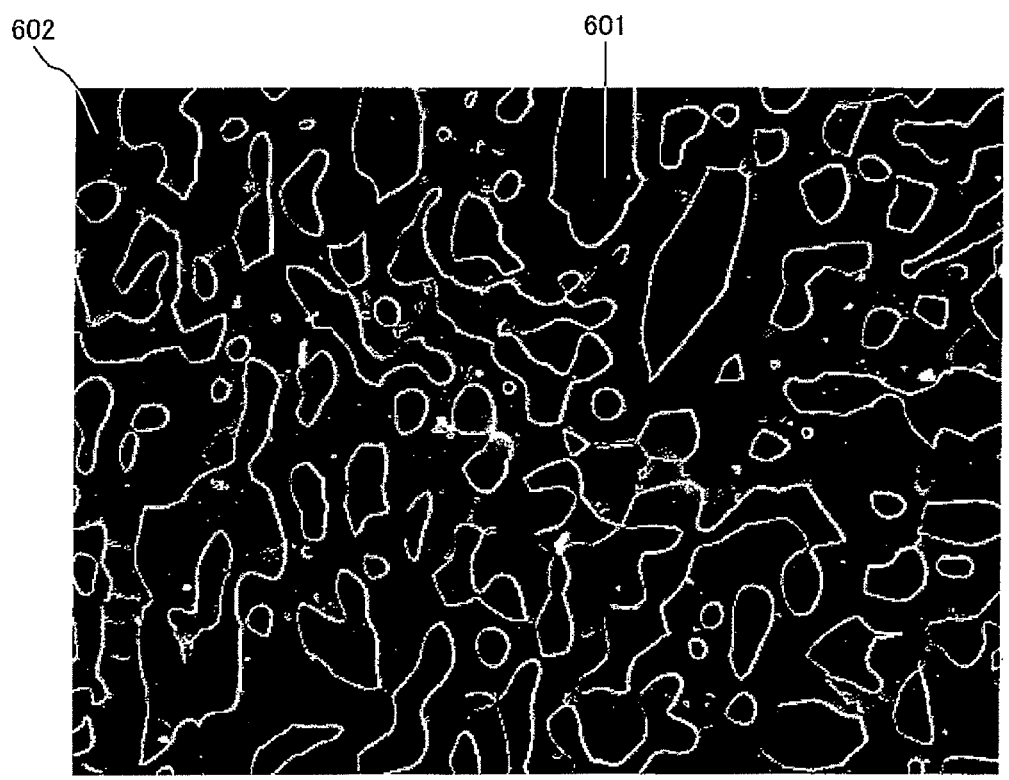
FIG. 6 is a pattern diagram to show a crystalline structure of Mo alloy.

FIG. 1 shows an embodiment of a friction stir welding tool 101 according to the present invention. A friction stir welding tool 101 according to this embodiment comprising a shank 102 connected to a spindle of the welding apparatus, a shoulder 103 which comes in contact with a surface of a material to be welded while welding is executed, and a pin 104 which is inserted into the material to be welded while welding is executed. The shank 102, shoulder 103 and the pin 104 which are made of Mo alloy having a dual phase microstructure of Mo and $Mo_5SiB_2$ are integrated into one unit. Composition of Mo alloy is Mo-8.7Si-17.4B, in which the measuring unit is mol %. As shown in a pattern diagram of FIG. 6, the crystalline structure of Mo alloy is composed of island shaped Mo-phase 601 and $Mo_5SiB_2$-phase 602 matrix which is an intermetallic compound.

Friction stir welding of iron material SS400 was executed by a friction stir welding tool wherein the diameter of its shoulder 103 is 15 mm, the diameter of the pin 104 is 5 mm at the portion 105 at which the pin 104 is connected to the shoulder 103, the diameter of the tip 106 of the pin 104 is 3 mm, and the length of the pin 104, which is the height of a portion protruding from the shoulder, is 2.5 mm. The material to be welded was 3-mm thick. The welding conditions were as follows: the rotation speed of the friction stir welding tool 101 was 800 rpm, and the welding speed was 200 mm per minute.

Furthermore, for the sake of comparison with the performance of the friction stir welding tool according to the present invention, welding tools made of various kinds of known materials in the prior art were used to execute friction stir welding of SS400 steel under the same conditions as those of the present invention. The tool materials used were of four kinds: tool steel, PCBN, W-0.002% K, and WC-Co.

When using a tool steel tool, at the time the tool came in contact with a material to be welded made of SS400, frictional heat was generated and simultaneously the pin was deformed preventing the tool from inserting into the material.

When using a PCBN (Polycrystalline Cubic Boron Nitride made by U.S. MegaStir) tool, the result of repeatedly inserting and removing the tool caused cracks to occur on the surface of the PCBN tool or the pin, causing the PCBN to chip in many cases. This seems to be because this PCBN material is a ceramic which becomes weak when exposed to a thermal shock.

When using a W-0.002% K tool, at the time the tool was inserted into a material, the pin was significantly deformed. The pin became shorter, and the diameter of the pin became thicker, and sufficiently deep welding was not possible. This seems to be because proof stress of the W-0.002% K material at the welding temperature is low.

When using a WC-Co tool, it was found that the shoulder of the WC-Co tool became significantly worn.

On the contrary, when using an Mo alloy tool according to the present invention, almost no deformation or wear occurred after the friction stir welding had been executed.

According to the results mentioned above, it was revealed that the Mo alloy tool according to the present invention is considerably suitable for friction stir welding of the SS400 steel. These results indicate that friction stir welding is effective for steel materials other than SS400.

Next, by using a friction stir welding tool having the above-mentioned composition according to the present invention, welding of titanium alloy composed of Ti-6Al-4V and titanium alloy composed of Ti-15V-3Cr-3Sn-3Al was executed. In comparison, welding was also executed by using a PCBN tool and a W-0.002% K tool.

In a welding test using a PCBN tool, it was observed that the PCBN tool became significantly worn. This seems to be because PCBN reacted with Ti. Furthermore, in a welding test using a W-0.002% K tool, in the same manner when welding SS400 material was welded, it was observed that the pin was deformed right after the tool had been inserted into the material, and the tool became worn quickly as the tool moved. On the contrary, when a Mo alloy tool according to the present invention was used, almost no deformation and wear was found after the welding had been finished.

According to the results mentioned above, it was verified that the Mo alloy tool according to the present invention is also effective for the friction stir welding of pure titanium and titanium alloy.

It is possible to make a friction stir welding tool according to the present invention by using Mo alloy as material for only a portion of the tool including the pin.

Figure 2:
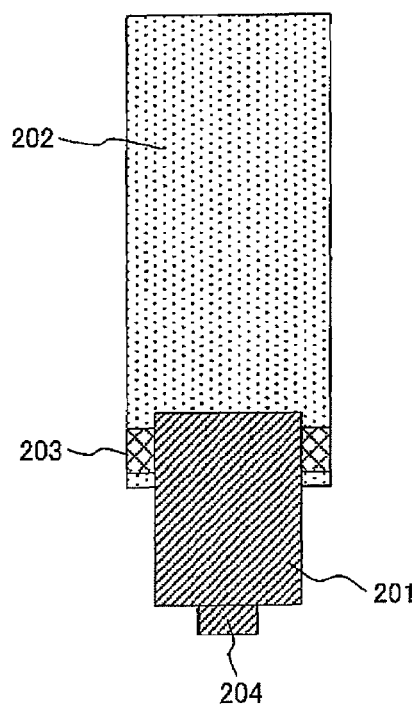
FIG. 2 is a schematic diagram to show a friction stir welding tool of another embodiment of the present invention.

FIG. 2 shows a friction stir welding tool wherein the tool tip 201 including the pin 204 and the shoulder is made of Mo alloy and fixed by using the shank 202 and the fixture 203. It is desirable that Ni-based super alloy including Inconel 600 or tool steel including SKD61 which is strong at high temperatures be used for a material of the shank 202.

The pin 204 shown in FIG. 2 is straight, however, the shape of the pin is not intended to be limited to that shape, and the shape of the pin can be as shown in FIG. 1.

Figure 3:
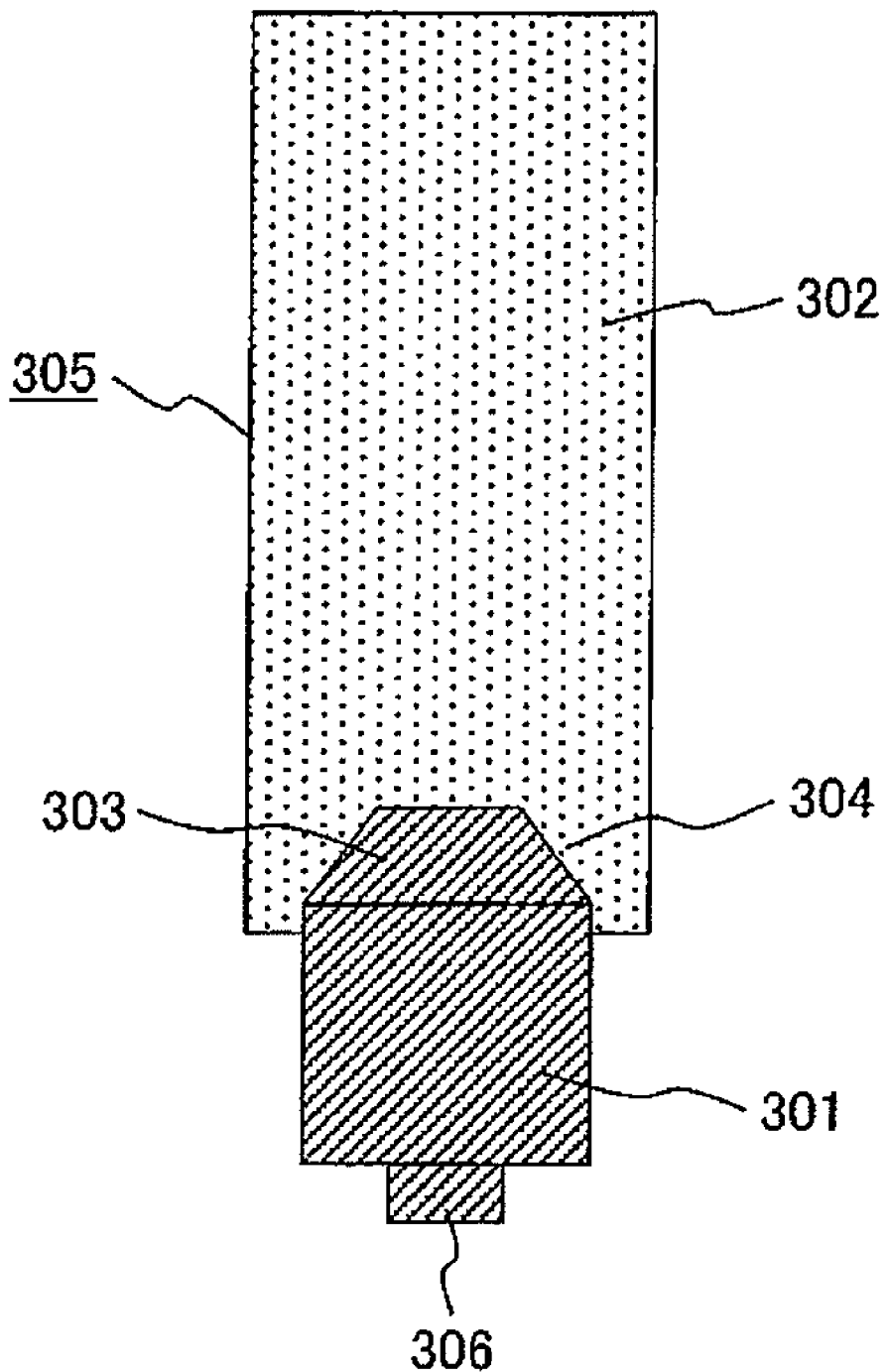
FIG. 3 is a schematic diagram to show a friction stir welding tool of other embodiment of the present invention.

FIG. 3 shows a friction stir welding tool 305 wherein the tool tip 301 including the pin 306 is made of Mo alloy and is fixed by the shank 302 and screws. The portion 303 at which the tool tip 301 is connected to the shank 302 and the portion 304 at which the shank 302 is connected to the tool tip 301 are screw-threaded, thereby fixing the tool tip 301 to the shank 302 by the screws. The threads have been made so that the direction of the screw threads is reverse from the rotation direction of the friction stir welding tool 305. In this case, in the same manner as shown in FIG. 2, Ni-based super alloy or tool steel including SKD61 which is strong at high-temperatures is suitable for the material of the shank 302.

When friction stir welding of high-melting material temperature was executed by using an Mo alloy tool having the composition mentioned above, it was found that deformation due to welding, spatter and residual stress become less than those occurring in the melt-welding method. The tool according to the present invention can be applied to the friction stir welding of the material of structural objects such as automobile panels and pipes. Furthermore, in addition to welding, the tool can be used for modifying material and repairing defects or cracks.

Embodiment 2

In this embodiment of the present invention, as shown in FIGS. 2 and 3, a method of making the tool tip of a friction stir welding tool by using Mo alloy, wherein the tool tip is fixed by the shank and the screws or the fixture will be explained.

Figure 4:
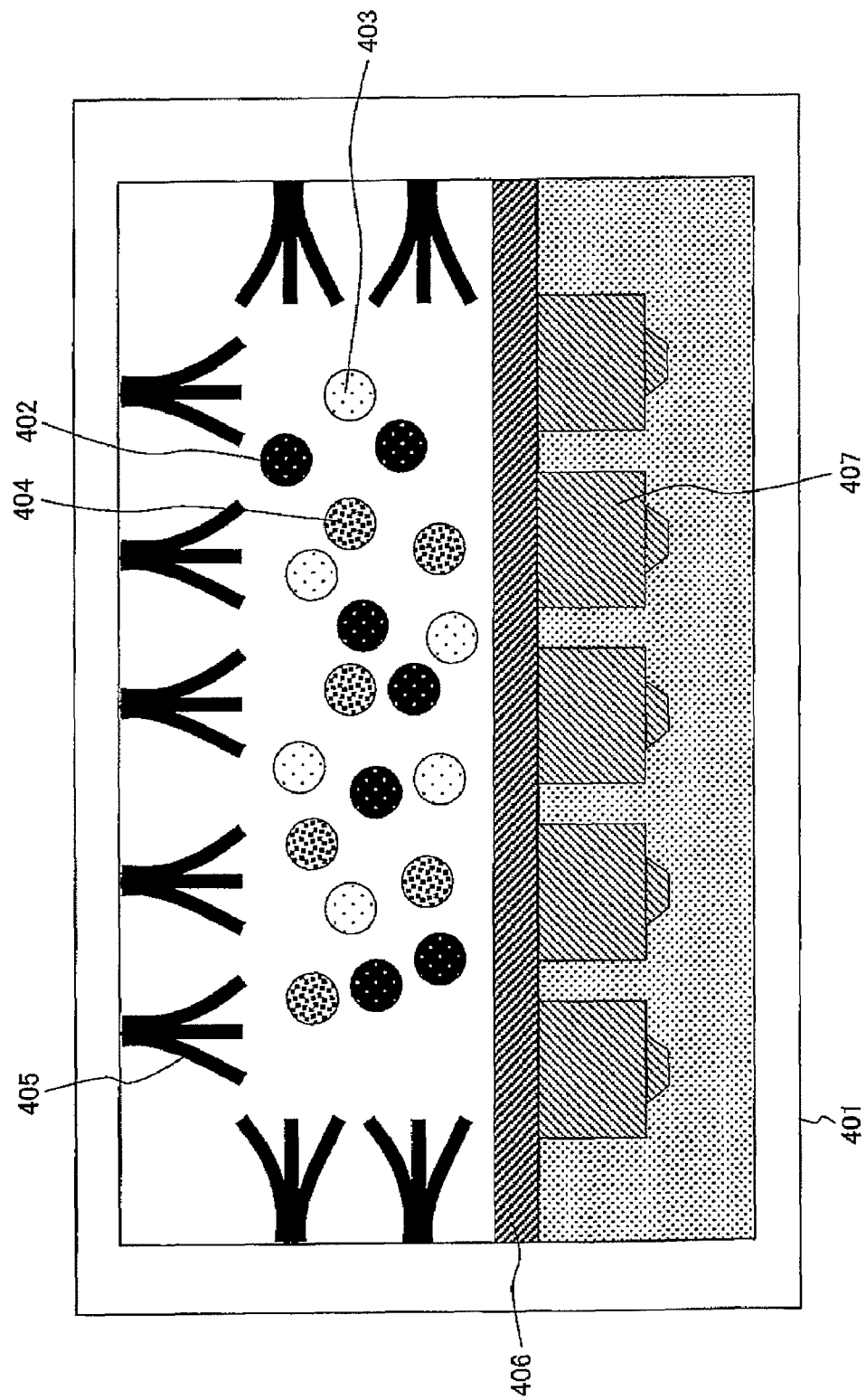
FIG. 4 is an explanatory diagram to show a method for making a tool tip by an Arc melting method.

FIG. 4 is an explanatory drawing to show a method of making the tool tip by the arc melting method. Mo material 402, Si material 403 and B material 404 are put in a melting furnace 401, and those materials are melted by an arc 405. Molten materials are mixed in the melting furnace 401. Mixed molten material 406 is then poured into a plurality of molds 407 in the shape of the tool tip. According to that work flow process, the tool tip is made. It is desirable that the molds 407 be heated to a temperature higher than the melting point of the molten material 406. By doing so, right after the molten material 406 has been put into the mold 407, the material is quickly solidified, and preventing the occurrence of defects including porosity. Instead of the arc melting method, the electron beam melting method can also be executed.

Figure 5:
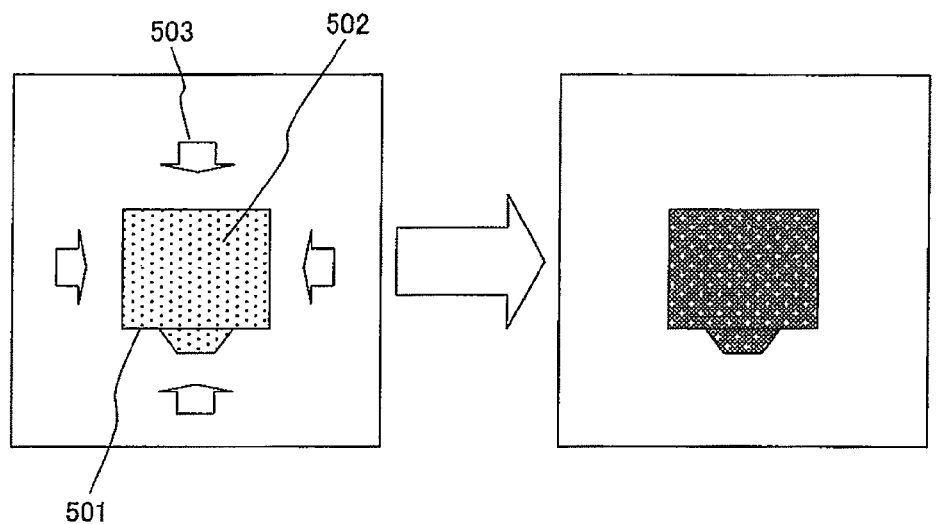
FIG. 5 is a schematic diagram to show a method for making a tool tip by a powder sintering method.

FIG. 5 shows a method of making a tool tip by a powder sintering method instead of using an arc melting method or an electron beam melting method. As shown in FIG. 5, a raw powder material 502 which includes Mo powder material, Si powder material and B powder material is put into the mold 501 having almost the same shape with the tool tip. After that, pressure 503 is applied thereby executing sintering. It is more effective to mix a binder with the raw powder material 502 and then execute sintering. Al and Ti can be used as the binder.

Embodiment 3

Figure 7:
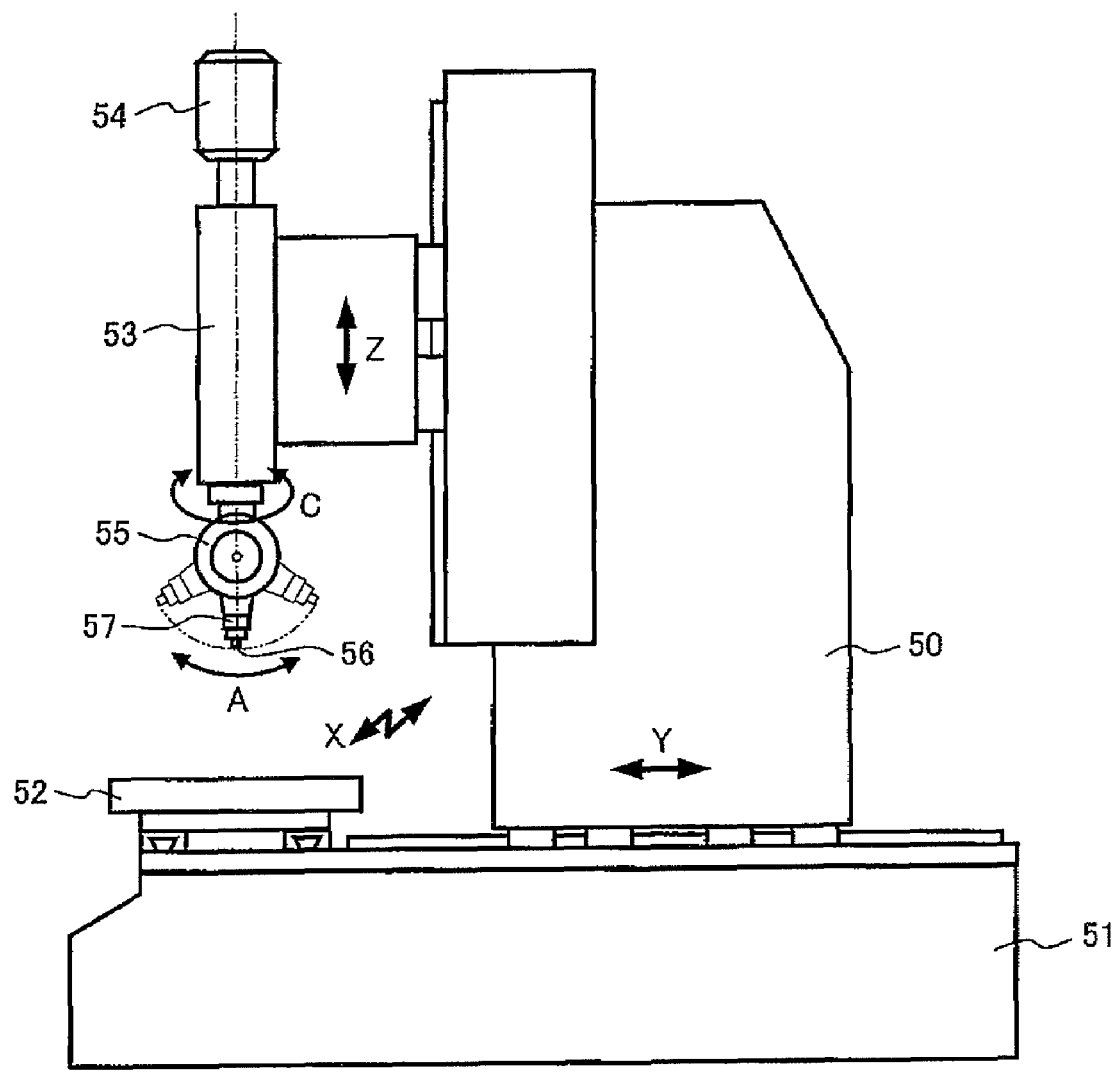
FIG. 7 is a configuration diagram to show a friction stir welding apparatus of an embodiment of the present invention.

FIG. 7 shows an embodiment of a friction stir welding apparatus equipped with a friction stir welding tool according to the present invention. This welding apparatus is a three-dimensional welding apparatus which incorporates a correction mechanism for correcting the relative distance between the tool and the material to be welded and is also a column-type apparatus made by modifying a column-type five-axis machining center. This welding apparatus has 5 axes: orthogonal 3 axes (X,Y,Z), rotational C axis around the Z axis, and A axis which is the wrist part of the tool tip. Because the tool is forcibly inserted into a material to be welded during friction stir welding, the welding apparatus must have high rigidity to withstand the reaction force to this insertion. Although the welding load is determined by many factors, such as the material to be welded, plate thickness, tool shape, rotation speed of tool, and welding speed, the load becomes higher as the plate thickness increases. Therefore, with regard to this welding apparatus, the column 50 moves in the Y direction and the work table 52 on which the material to be welded is installed moves in the X direction on the platform 51, respectively. Furthermore, the head 53 moves in the Z direction. Moreover, a gear box 55 which holds the rotational C axis and the tool tip wrist A axis is disposed at the lower portion of the head 53. The tool 56 is driven by a spindle motor 54 which is a tool rotating mechanism. A correction mechanism for correcting the relative distance between the tool 56 and the material to be welded is located between the tool 56 and the gear box 55.

The material to be welded is placed on the work table 52 of the friction stir welding apparatus configured as mentioned above, the head 53 descends to insert the tool 56 into the welding portion of the material to be welded and the tool 56 moves thereby enabling the execution of friction stir welding. Moreover, this welding apparatus is merely one embodiment and is not intended to be limited to this embodiment.

What is claimed is:

1. A friction stir welding tool having a pin that protrudes from an end face of a cylindrical member, wherein at least the pin is made of Mo alloy having a dual phase microstructure of Mo-phase and intermetallic compound $Mo_5SiB_2$-phase, wherein the Mo alloy is composed of 6.0 to 10.0 mol % of Si, 10.0 to 20.0 mol % of B, and 20 to 60% of Mo-phase volume content, and wherein said Mo alloy has island-shaped Mo-phase and $Mo_5SiB_2$-phase matrix.

2. The friction stir welding tool according to claim 1, wherein the tool is integrated into one unit made of Mo alloy having a dual phase microstructure of Mo-phase and intermetallic compound $Mo_5SiB_2$-phase.

3. The friction stir welding tool according to claim 1, wherein the tool comprises a cylindrical shank, shoulder and the pin, and the pin and the shoulder are integrated into one unit made of the Mo alloy and are fixed to the shank by a screw or a fixture.

4. A friction stir welding apparatus having a tool with a pin that protrudes from an end face of a cylindrical member and a tool rotating mechanism, and the pin of the tool is inserted into a welding portion of a material to be welded while the pin rotates thereby executing welding; at least the pin of the tool being made of Mo alloy having a dual phase microstructure of Mo-phase and intermetallic compound $Mo_5SiB_2$-phase,
wherein the Mo alloy is composed of 6.0 to 10.0 mol % of Si, 10.0 to 20.0 mol % of B, and 20 to 60% of Mo-phase volume content, and
wherein said Mo alloy has island-shaped Mo-phase and $Mo_5SiB_2$-phase matrix.

5. The friction stir welding tool according to claim 1, suitable for friction stir welding a material selected from the group consisting of aluminum alloy, magnesium alloy, copper alloy, steel, titanium alloy, Ni alloy and Ni-based super alloy.

6. The friction stir welding tool according to claim 5, suitable for friction stir welding steel.

7. The friction stir welding apparatus according to claim 4, suitable for friction stir welding a material selected from the group consisting of aluminum alloy, magnesium alloy, copper alloy, steel, titanium alloy, Ni alloy and Ni-based super alloy.

8. The friction stir welding apparatus according to claim 7, suitable for friction stir welding steel.

* * * * *